United States Patent
Hiltunen et al.

(10) Patent No.: US 10,476,748 B2
(45) Date of Patent: Nov. 12, 2019

(54) MANAGING PHYSICAL RESOURCES OF AN APPLICATION

(71) Applicant: AT&T Intellectual Property I, L.P., Atlanta, GA (US)

(72) Inventors: Matti Hiltunen, Morristown, NJ (US); Gueyoung Jung, Belle Mead, NJ (US); Joseph D'Andrea, III, Basking Ridge, NJ (US); Kaustubh Joshi, Scotch Plains, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 325 days.

(21) Appl. No.: 15/446,880

(22) Filed: Mar. 1, 2017

(65) Prior Publication Data

US 2018/0255121 A1 Sep. 6, 2018

(51) Int. Cl.
| | |
|---|---|
| *G06F 15/173* | (2006.01) |
| *H04L 12/24* | (2006.01) |
| *G06F 9/445* | (2018.01) |
| *G06F 8/60* | (2018.01) |
| *G06F 9/455* | (2018.01) |

(52) U.S. Cl.
CPC ............... *H04L 41/12* (2013.01); *G06F 8/60* (2013.01); *G06F 9/445* (2013.01); *G06F 9/45558* (2013.01); *H04L 41/0806* (2013.01); *H04L 41/0893* (2013.01); *G06F 2009/45562* (2013.01); *G06F 2009/45595* (2013.01)

(58) Field of Classification Search
CPC ....... H04L 41/12; G06F 8/60; G06F 9/45558; G06F 9/445; G06F 2009/45595; G06F 2009/45562
See application file for complete search history.

(56) References Cited

U.S. PATENT DOCUMENTS

| | | | |
|---|---|---|---|
| 9,032,077 B1* | 5/2015 | Klein | H04L 29/08 370/395.21 |
| 9,038,083 B2 | 5/2015 | Huang et al. | |
| 9,317,336 B2 | 4/2016 | Alicherry | |
| 9,367,344 B2 | 6/2016 | Udupi et al. | |
| 9,882,828 B1* | 1/2018 | Sandlerman | H04L 47/74 |
| 2012/0311594 A1* | 12/2012 | Hosono | G06F 8/20 718/102 |
| 2013/0268672 A1 | 10/2013 | Justafort et al. | |
| 2013/0290541 A1 | 10/2013 | Hatasaki et al. | |

(Continued)

OTHER PUBLICATIONS

Gupta et al.; "Optimizing VM Placement for HPC in the Cloud"; ACM—Proceedings of the 2012 Workshop on Cloud services; 2012; 6 pages, Sep. 2012.

(Continued)

*Primary Examiner* — John B Walsh
(74) *Attorney, Agent, or Firm* — BakerHostetler

(57) ABSTRACT

A method includes, for components of an application, identifying a plurality of groups including a first group and a second group, The method also includes nesting the first group into the second group to create a nested group, based at least on a level of the first group not exceeding a level of the second group. The method includes deploying the application by placing the components of the nested group within a network in accordance with a restriction of the nested group. The components include at least one virtual machine.

20 Claims, 9 Drawing Sheets

(56) References Cited

U.S. PATENT DOCUMENTS

| | | |
|---|---|---|
| 2014/0278326 A1* | 9/2014 | Sharma .................... G06F 8/60 703/13 |
| 2015/0127834 A1 | 5/2015 | Udupi et al. |
| 2015/0220357 A1 | 8/2015 | Huang et al. |
| 2015/0350102 A1 | 12/2015 | Leon-Garcia et al. |
| 2016/0080201 A1 | 3/2016 | Huang et al. |
| 2016/0127478 A1* | 5/2016 | Chastain ............. H04L 41/5054 709/223 |
| 2016/0234250 A1 | 8/2016 | Ashley et al. |
| 2016/0359668 A1 | 12/2016 | Udupi et al. |
| 2018/0191607 A1* | 7/2018 | Kanakarajan ......... G06F 9/5077 |

OTHER PUBLICATIONS

Bazarbayev et al.; "Content-Based Scheduling of Virtual Machines (VMs) in the Cloud"; IEEE 33$^{rd}$ Int'l Conf. Distributed Computing Systems (ICDCS); 2013; 9 pages.

\* cited by examiner

MANAGING PHYSICAL RESOURCES OF AN APPLICATION

TECHNICAL FIELD

This disclosure relates generally to network management and, more specifically, to network design and capacity planning.

BACKGROUND

To provide a service or application (generally "an application") using virtualized network platforms, a set of one or more virtual network functions (VNFs) may be instantiated on general purpose hardware. For example, a VNF may be a firewall, cache, gateway, intrusion detection system, or the like. Each VNF may require one or more virtual machines (VMs) to be instantiated. In turn, VMs may require various resources, such as memory, virtual computer processing units (vCPUs), and network interfaces or network interface cards (NICs). Determining how to assign these resources among in an efficient manner may be unbearably complex.

This disclosure is directed to solving one or more of the problems in the existing technology.

SUMMARY

In an aspect, a method may include identifying VMs to be instantiated to deploy an application on a network infrastructure. The network infrastructure may have a hierarchy including a server level, a rack level, and a site level. The method may include identifying a first restriction regarding placement of a first group of the VMs and a second restriction regarding placement of a second group of the VMs. The method may include, based at least on a level of the first restriction not exceeding a level of the second restriction, nesting the first group into the second group to create a nested group having members that include the first group and each VM of the second group. The method may also include determining a resource requirement of the nested group by summing together a respective resource requirement of each of the members. The method may include identifying a placement of the nested group within the network infrastructure based at least on the second restriction and the resource requirement and deploying the nested group based at least on the placement of the nested group.

In another aspect, a method may include for components of an application, identifying a plurality of groups including a first group and a second group. The method may also include nesting the first group into the second group to create a nested group, based at least on a level of the first group not exceeding a level of the second group. The method may also include deploying the application by placing the components of the nested group within a network in accordance with a restriction of the nested group. The components may include at least one VM.

According to yet another aspect, a system may include an input/output and a processor communicatively coupled to the input/output. The system may also include memory storing instructions that cause the processor to effectuate operations. The operations may include identifying VMs to be instantiated to deploy an application on a network infrastructure. The network infrastructure may have a hierarchy including a server level, a rack level, and a site level. The operations may include identifying a first restriction regarding placement of a first group of the VMs and a second restriction regarding placement of a second group of the VMs. The operations may also include determining that the first group and the second group each include a common VM of the VMs. The operations may include, based at least on a level of the first restriction not exceeding a level of the second restriction, nesting the first group into the second group to create a nested group having members that include the first group and each VM of the second group. The operations may also include determining a resource requirement of the nested group by summing together a respective resource requirement of each of the members. The operations may include identifying a placement of the nested group within the network infrastructure based at least on the second restriction and the resource requirement and deploying the nested group based at least on the placement of the nested group.

BRIEF DESCRIPTION OF THE DRAWINGS

In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

DETAILED DESCRIPTION

Figure 1A:
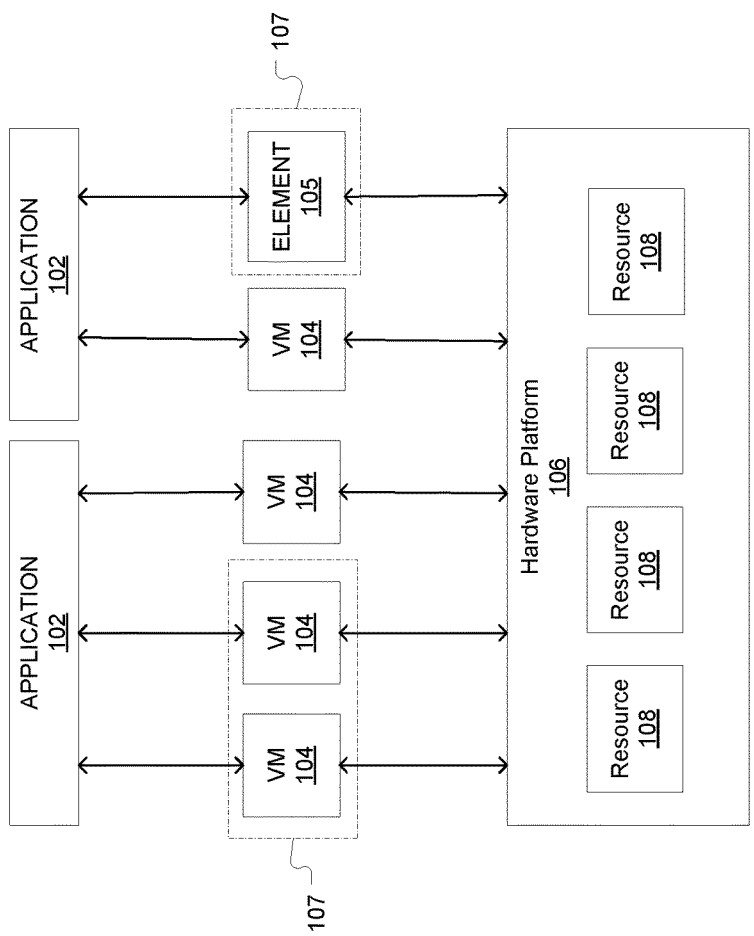
FIG. 1A is a representation of an exemplary network.

FIG. 1A is a representation of an exemplary network 100. Network 100 may include one or more applications (which in turn may include one or more VNFs) implemented on general purpose hardware, such as in lieu of having dedicated hardware for every network function. That is, general purpose hardware of network 100 may be configured to run applications.

Each application 102 may use one or more virtual machines (VMs) 104 or elements 105 to operate. Each VM 104 may have a VM type that indicates its functionality or role. Examples of VMs 104 include gateways (GWs), firewalls (FW), routers, realtime analytics, customer edges (vCEs), provider edges (vPEs), proxies, rendezvous points (RPs) or the like. Similarly, each element 105 may have an element type that indicates is functionality or role. Examples of elements 105 include an ingress point, an egress point, a non-virtualized function, or the like. While specific reference may be made to VMs 105 or groups (which may include one or more elements 105), this is for explanation to show that the deployment plan may not necessarily limited to virtual components in all implementations.

Each VM 104 may consume various network resources from a hardware platform 106, such as resources 108. For example, resources 108 may include one or more virtual central processing units (vCPUs), memory, or a network interface cards (NIC).

Figure 1B:
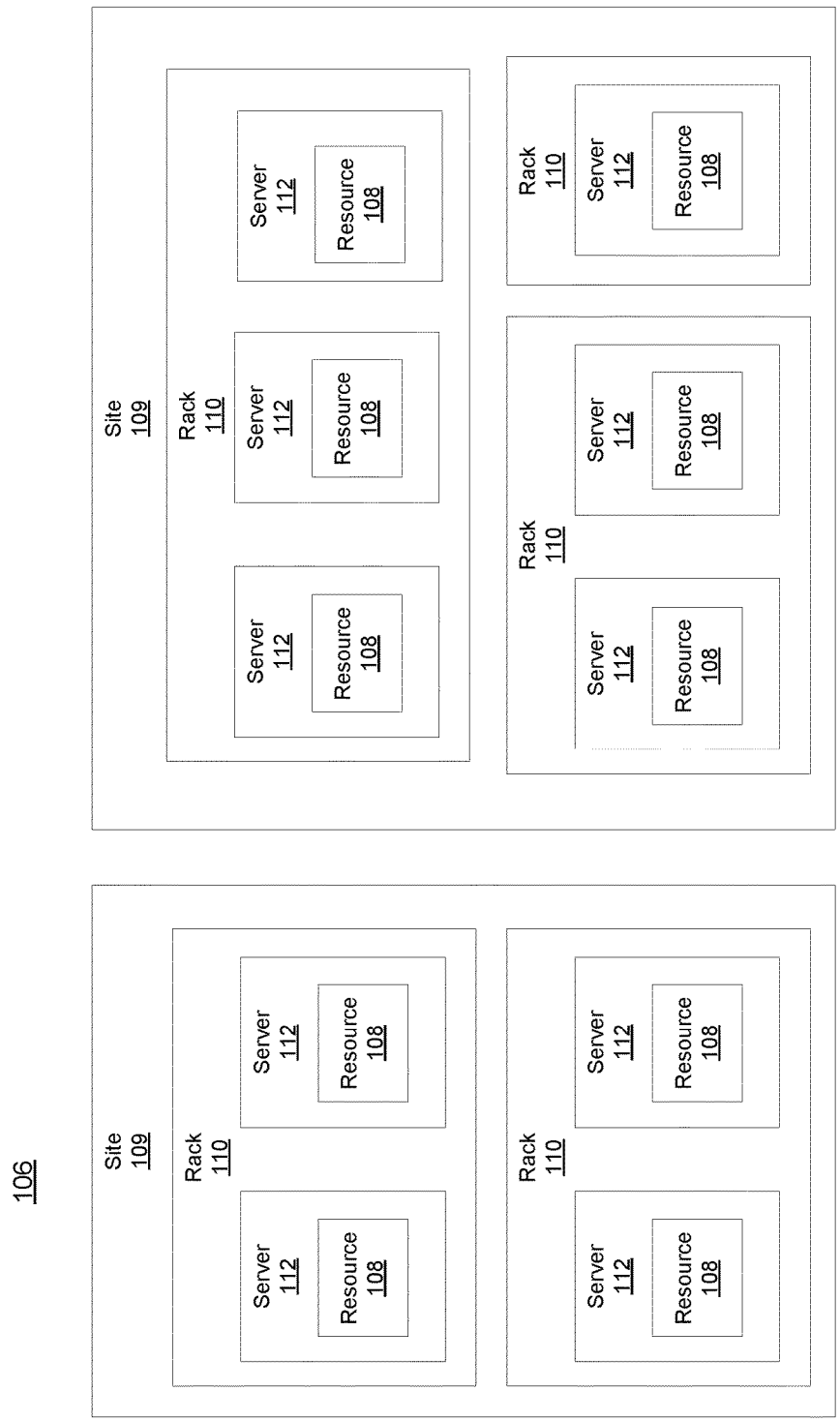
FIG. 1B is a representation of an exemplary hardware platform for a network.

While FIG. 1A illustrates resources 108 as collectively contained in hardware platform 106, the configuration of hardware platform 106 may be further delineated. FIG. 1B provides an exemplary implementation of hardware platform 106.

Hardware platform 106 may comprise one or more sites 109. For example, a site 109 may be a room, building, or geographic location in which resources 108 are located. For example, site 109 may be a datacenter. Each site 109 may comprise one or more racks 110. In an aspect, rack 110 may refer to the physical housing or platform for multiple servers or other network equipment. In an aspect, rack 110 may also refer to the underlying network equipment. Each rack 110 may include one or more servers 112. Server 112 may comprise general purpose computer hardware or a computer. In an aspect, rack 110 may comprise a metal rack, and servers 112 of rack 110 may comprise blade servers that are physically mounted in or on rack 110.

Each server 112 may include one or more network resources 108, as illustrated. Servers 112 may be communicatively coupled together (not shown) in any combination or arrangement. For example, all servers 112 within a given site 109 or rack 110 may be communicatively coupled. As another example, servers 112 in different racks 110 may be communicatively coupled. Additionally or alternatively, racks 110 may be communicatively coupled together (not shown) in any combination or arrangement.

The characteristics of each site 109, rack 110, and server 112 may differ. For example, the number of racks 110 within two sites 109 may vary, or the number of servers 112 within two racks 110 may vary. Additionally or alternatively, the type or number of resources 108 within each server 112 may vary. In an aspect, rack 110 may be used to group servers 112 with the same resource characteristics. In another aspect, servers 112 within the same rack 110 may have different resource characteristics.

A single application 102 may include many functional components (e.g., VMs 104 and elements 105. These components may have dependencies upon each other and intercommunication patterns with certain quality of service (QoS) requirements, such as locality, high availability, and security. Consequently, placement decisions—that is, decisions on how (and where) to implement VMs 104 and other elements 105 within hardware platform 106—may be based on all VMs 104 in which the components of application 102 run, including the dependencies of those VMs 104, holistically.

Such QoS requirements may be domain or application specific. Thus, a deployment plan for assigning resources 108 to VMs 104 of an application may depend upon certain limitations and requirements of both network 100 and application 102, such as the QoS requirements of a given application 102 and the underlying infrastructure of network 100. As all of this information is not typically accessible to both the application provider (that may not have access to network infrastructure details) and the cloud provider (that may not have access to the functionality of application 102), an abstraction may be used to create a deployment plan for application 102, where creation of the deployment plan can occur without knowledge or consideration of the specific infrastructure information.

A deployment plan may assign VMs 104 to particular resources 108 in accordance with one or more rules in order to account for the requirements of application 102 supported by such VMs 104. These rules may be based on abstracting the requirements of application 102, such as by levering the application provider's knowledge on its application 102 to yield a concise and flexible representation of the locality, availability, and security requirements of application 102 without needing to capture the specifics of the cloud infrastructure underlying network 100. The deployment plan may be based on one or more affinity rules, diversity (or anti-affinity) rules, exclusivity rules, or pipe rules. The deployment plan may further be based on nesting groupings (e.g., rules or sets of VMs 104). For example, the abstraction may provide for certain VMs 104 to be grouped together, so that rules may be applied to groups of VMs 104 or to individual VMs 104. A group may include one or more VMs 104, or other elements 105, such as ingress points, or the like. For example, FIG. 1A shows two exemplary groups 107.

An affinity rule may require that certain VMs 104, certain groups 107, or a mix of VMs 104 and groups 107, be hosted together on the same server 112, rack 110, or site 109. (While reference is made to a three-level hierarchy—server, rack, and site—the same technology may be applied to different types or levels of hierarchies.) For example, a server-level affinity rule may be represented by the following, where each member of the rule (e.g., the certain VMs 104 or groups 107), is represented as element g and the affinity group 107 created by the affinity rule is represented as element G:

$$g_{server}^{aff} \in G$$

As another example, a rack-level affinity rule may be represented by the following:

$$g_{rack}^{aff} \in G$$

As another example, a site-level affinity rule may be represented by the following:

$$g_{site}^{aff} \in G$$

A diversity rule (e.g., an anti-affinity rule) may require that certain VMs 104, certain groups 107, or a mix of VMs 104 and groups 107, be hosted on different servers 112, racks 110, or sites 109. For example, the following equations may represent a server-level diversity rule, a rack-level diversity rule, and a site-level diversity rule, respectively, where each member of the rule (e.g., the certain VMs 104 or groups 107), is represented as element g and the diversity group 107 created by the diversity rule is represented as element G:

$$g_{server}^{div} \in G$$

$$g_{rack}^{div} \in G$$

$$g_{site}^{div} \in G$$

An exclusivity rule may require that certain VMs 104 or certain groups of VMs 104 all owned by a group of tenants be placed into servers 112, racks 110, or sites 109 in which no other tenant's VMs 104, groups 107, or mixes of VMs 104 and groups 107, are hosted. That is, application provider may have exclusive placement rights in that server 112, rack 110, or site 109. For example, the following equations may represent a server-level exclusivity rule, a rack-level exclusivity rule, and a site-level exclusivity rule, respectively, where each member of the rule (e.g., the certain VMs 104 or groups 107), is represented as element g and the exclusivity group 107 created by the exclusivity rule is represented as element G:

$$g_{server}^{ex} \in G$$

$$g_{rack}^{ex} \in G$$

$$g_{site}^{ex} \in G$$

A pipe rule may require that a pairing of two VMs 104, two groups 107 or one VM 104 and one group 107 have a specific communication requirement (e.g., bandwidth or latency requirement). A pipe may be represented by the following equation, where m and m' are the two elements (e.g. VMs 104 or groups 107) that have the specific communication requirement:

$$p(m,m')$$

In this implementation, m may be the ancestor of m' and m' may be the descendant of m.

These rules may be nested together to any depth. This is illustrated above, for example, as any of the members of any of the rules can be either a VM 104 or a group 107. Groups 107 can then include multiple VMs 104 (or other elements 105) that are already themselves the subject of another rule. For example, multiple affinity groups may be nested into a single diversity group. As another example, multiple diversity groups may be nested into a single affinity group. As another example, multiple affinity groups may be nested into a single exclusivity group.

In a particular deployment plan, multiple memberships and intersections between groups should be verified to avoid conflicts. For example, while a particular VM 104 v may be membered in multiple groups (e.g., two different affinity groups), v must be placed in a single server 112. As another example, conflicts may arise between groups. For example, if a particular VM 104, V1, is in a server-level affinity group with another VM 104 V2, but V1 is also in a server-level affinity group with a third VM 104, V3, then a conflict may arise if V2 and V3 were in a server-level diversity group together. That is, no deployment would allow V1 to exist on the same server 112 as V2 and V3 while V2 and V3 exist on separate servers 112.

Figure 2A:
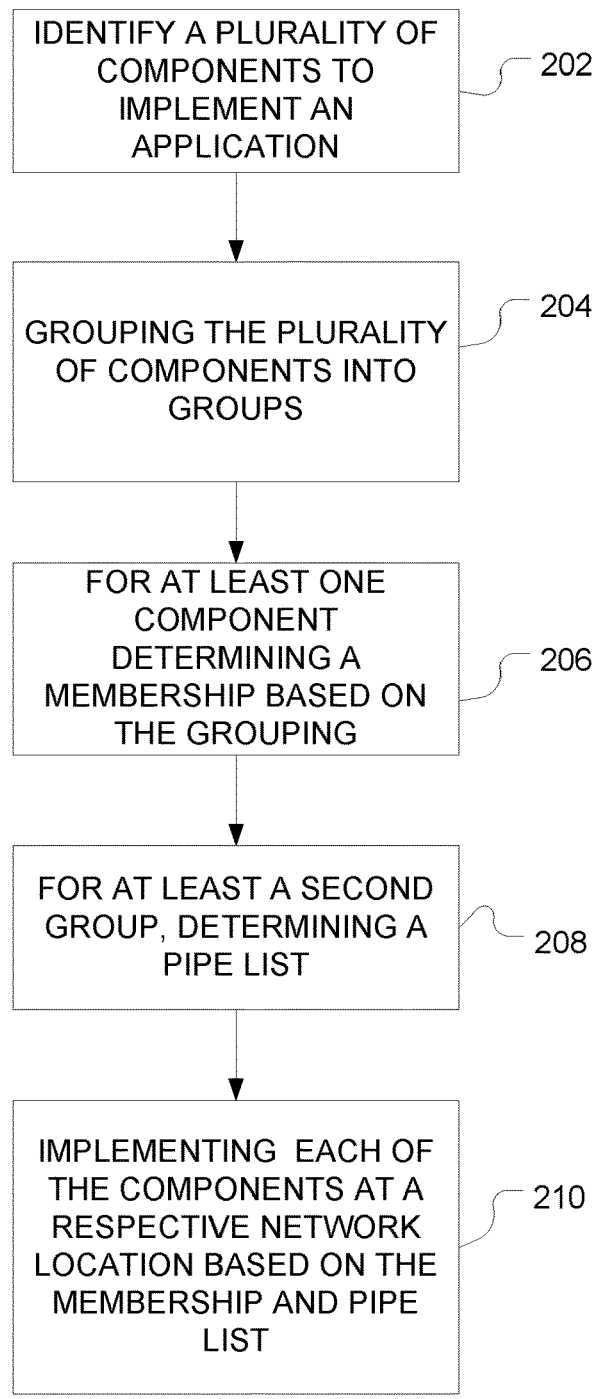
FIG. 2A is a method that may be used to deploy an application.

FIG. 2A illustrates a method 200 for deploying resources for a particular application 200. Variations of method 200 may achieve the same purpose as method 200. Thus, not all steps illustrated in FIG. 2A or described below are necessary for every implementation of method 200. Further, the following steps of method 200 are described using specific examples, but none of these examples should be interpreted as the only or necessary implementation of such steps.

In exemplary method 200, step 202 may include identifying a plurality of VMs 104 to implement application 102. The plurality of VMs 104 may be all of the VMs 104 used to implement application 102. Alternatively, the plurality of VMs 104 may be a subset of the VMs 104 to implement application 102. Step 202 may include identifying a plurality of specifications for application 102 or its VMs 104 or groups 107. The specifications may form the basis for the rules used to deploy application 102. The specifications may be based on QoS requirements of application 102 (or a subset thereof). For example, specifications may dictate which VMs 104 or groups 107 are to be implemented on the same (or different) server 112, rack 110, or site 109. As another example, specifications may dictate which VMs 104 or groups 107 are to be implemented on exclusive (as opposed to multi-tenant) servers 112, racks 110, or sites 109. As yet another example, specifications may dictate that a pair components (e.g., two VMs 104, two groups 107, or a VM 104 and a group 107) must be located within a proximity of one other. In short, the specifications may dictate affinity rules, anti-affinity rules, exclusivity rules, or pipes.

For example, in a first application 102, most of the communications may occur within each group of an application. Thus, the application provider may want to group those VMs 104 explicitly. Additionally or alternatively, it may be desirable to place the VMs 104 of the group close enough together to improve performance, such as a result of the decrease in competition in a multi-tenant site 109 or by avoiding unreliable networks across remote sites 109. Meanwhile, it may be advantageous or desirable to have some frontend components, such as a vCE, in a given proximity to particular group 107, such as an ingress point IP. Another specification could include placing multiple application components that refer to the same data in the same server 112, rack 110, or site 109. These specifications may be implemented using syntax or commands that invoke the respective rule. The proximity between vCE and IP may be guaranteed by using the pipe rule p(vCE, IP), and the requirements that multiple application components be placed in the same location may use one or more affinity rules.

As another example, in a second application 102, an application provider may replicate application components across servers 112, racks 110, or sites 109. Such replication may be used to improve the service availability and fault tolerance. Additionally or alternatively such replication may be used for incremental system maintenance, such as rolling upgrades. Spreading out replication placements may be implemented by one or more diversity rules.

As another example, in a third application 102, certain security concerns may be represented or accounted for. For example, a security-sensitive VM 104 may be grouped with a controller VM 103 using an affinity rule. Additionally or alternatively, a host-level exclusivity rule may place the security-sensitive VMs 104 in a protected server 112 (e.g., one that is not accessible by other tenants).

Step 202 may be based upon data input, such as from application provider. This input may be provided in a predefined syntax, and application provider may have optionally already defined one or more groups 107, such as based on one or more affinity, diversity, or exclusivity rules.

At step 204, method 200 may continue by creating groups based on the specifications provided in step 204. For example, this may include merging or nesting VMs 104, groups 107, or elements 105 into larger groups 107. For example, when a given VM 104 or group 107 is a child (e.g., member) of multiple affinity groups 107, those multiple affinity groups 107 can be merged, or nested. For example, this may include nesting the lower-level group 107 to the higher-level or same-level group 107).

For example, for V1 to be co-placed on the same server 112 with V2 according to an affinity group G1 and for V1 to also have to be co-placed in another affinity group G2, then groups G1 and G2 can be merged into a single affinity group 107. Merging affinity groups 107 may include calculating the intersection of G1 and G2.

As another example, a given VM 104 or group 107 may be a member of multiple diversity groups 107. This can present a situation where there are multiple diversity relationships between two groups. To merge multiple diversity groups 107, the highest level (e.g., server 112 level, rack 110 level, or site 109 level) of diversity groups 107 may be considered when making placements.

Merging groups 107 may be level restricted, such that a higher-level group 107 may not be nested into a lower-level group 107. That is, a server-level group 107 may be nested into another server-level group 107, a rack-level group 107 or a site-level group 107. Additionally or alternatively, a rack-level group 107 may be nested into another rack-level group 107 or a site-level group 107. Additionally or alternatively, a site-level group 107 may be nested into another site-level group 107. However, neither a rack-level group 107 nor a site-level group 107 may be nested into a server-level group 107, and a site-level group 107 may not be nested into a rack-level group 107.

Merging groups 107 may be done to simplify the calculations needed to place members of the nested groups 107 in hardware platform 106. For all given groups 107, each member of each group 107, each VM 104, each pipe, and each pipe's members may be checked from their lowest-level group (e.g., server-level). Each member of group 107 may have certain resource 108 requirements. Each member of group 107 may be deleted, and its resource 108 requirements may be added to the resource 108 requirements of that group 107. Similarly, each diversity or affinity of that member may be added to the diversity or affinity requirements of group 107.

At step 206 method 200 may include determining for a group 107, a membership list of that group 107. This may be based on group scoping and may be done when a member of a second group 107 is the group 107. For example, group-scoping may take into account diversities and exclusivities of each member of a particular group 107. This may include, for each member of group 107, comparing its diversities and exclusivities with those of the parent group 107. If the levels of the member's diversities or exclusivities are beyond those of the parent, it adds them to the parent group 107 to consider when placing parent group 107. Group scoping may be done recursively.

Pipe-scoping, on the other hand, may take into account communication parameters of each member of group 107. Pipe-scoping of group 107 may be used to determine the bandwidth (or other communication) requirements of group 107, which may affect placement of group 107. In an aspect, pipe-scoping may be a factor only if one of the two elements of the pipe is not a member of group 107. This is because, for example, group 107 may not need additional bandwidth to satisfy a bandwidth requirement of two VMs 104 if both VMs 104 are to be implemented on the same server 112, according to the affinity rule that defines group 107. Thus, pipe-scoping may include determining which pipe rules apply to exactly one member of group 107, and disregarding all other pipe rules for purposes of that group 107. Thus, pipe-scoping may take into account outbound pipes of each member of group 107, such that each pipe that is identified as having a descendant that is outside of group 107 and a parent that is inside of group 107, that pipe may be added to the list of pipes. Additionally or alternatively pipe-scoping may take into account inbound pipes of each member of group 107.

Resolving and scoping groups 107 may result in identifying one or more pipes or memberships of each VM 104 or group 107. The pipe(s) of each VM 104 or group 107 may identify a networked destination with a required bandwidth or latency. The memberships of each VM 104 or group 107 (and, optionally, the children of each group 107) may be used to determine the resource 108 requirements of that VM 104 or group 107.

Figure 2B:
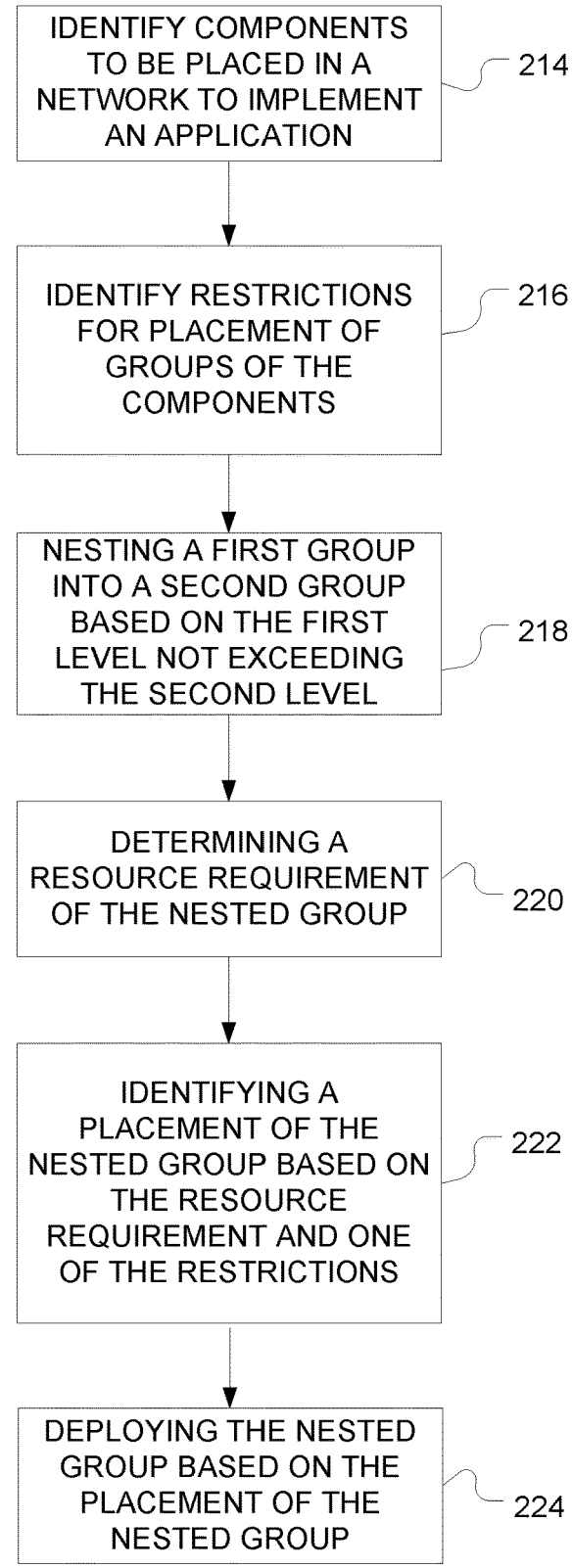
FIG. 2B is a method that may be used to deploy an application.

FIG. 2B is a flowchart of an exemplary method 212 for deploying application 102 on network 100. In exemplary method 212, step 214 may include identifying a plurality of VMs 104 to implement application 102. These VMs 104 may be instantiated to deploy application 102 on network 100. As discussed above with respect to FIG. 1B, network 100 may have a hierarchy, including, for example, a server level, a rack level, and a site level, where the server level is the lowest level of the three stated levels and the site level is the highest of the three stated levels. The plurality of VMs 104 may be all of the VMs 104 used to implement application 102. Alternatively, the plurality of VMs 104 may be a subset of the VMs 104 to implement application 102. Step 202 may include identifying a plurality of specifications for application 102 or its VMs 104 or groups 107. The specifications may form the basis for the rules used to deploy application 102. The specifications may be based on QoS requirements of application 102 (or a subset thereof). For example, specifications may dictate which VMs 104 or groups 107 are to be implemented on the same (or different) server 112, rack 110, or site 109. As another example, specifications may dictate which VMs 104 or groups 107 are to be implemented on exclusive (as opposed to multi-tenant) servers 112, racks 110, or sites 109. As yet another example, specifications may dictate that a pair components (e.g., two VMs 104, two groups 107, or a VM 104 and a group 107) must be located within a proximity of one other. In short, the specifications may dictate affinity rules, anti-affinity rules, exclusivity rules, or pipes.

For example, at step 216, method 212 may include identifying a first restriction regarding placement of a first group 107 and a second restriction regarding placement of a second group 107. The members of the first group 107 may overlap with the members of the second group. The first restriction may be an affinity rule, a diversity rule or an exclusivity rule. The second restriction may have a second level (e.g., server level, rack level, or site level). The second restriction may be an affinity rule, a diversity rule or an exclusivity rule. The first restriction may have a first level (e.g., server level, rack level, or site level).

At step 218, the first group 107 may be nested into the second group 107 based on the level of the first group not exceeding the level of the second group. As discussed above, in some implementations, a group 107 cannot be nested into a second group 107 if that first group 107 has a higher level than the second group. Other restrictions may apply to nesting. For example, nesting may be prohibited where both of the groups 107 to be nested are exclusivity groups. As another example, nesting may be done when both the first group 107 and the second group 107 share a common group member (e.g. element 105 or VM 104).

In some aspects, a nested group 107 may be placed as a whole (e.g., rather than having each of its members placed individually) in network 100. Thus, at step 220, the resource 106 requirement of nested group 107 may be determined by adding up the resource 106 requirements of its members. For example, nested group 107 consists of two VMs 104, and each VM requires four vCPUs, then the resource 106 requirement of nested group 107 may include eight vCPUs.

The rules (e.g., affinity, diversity, exclusivity) of one or more of the groups 107 nested to create nested group 107 may dictate placement of nested group 107. For example, consider a nested group 107 made of two groups 107, wherein the first restriction of first group 107 requires that V1, V2, and V3 be placed in the same server 112, and the second restriction of the second group 107 requires that V2 and V3 be placed in the same server 112. Then the restriction of the nested group would be the same as the first restriction (as the first restriction is inclusive of the second restriction). On the other hand, if the second restriction of the second group 107 requires that V2, V3, and V4 be placed in the same server 112, then the restriction of the nested group 107 would require V1, V2, V3, and V4 all be placed in the same server 112. While these examples deal with the same type of restriction (affinity rule) and the same restriction level (server level), the same analysis applies equally to restrictions of different types or levels.

The restrictions may also include pipe rules, as discussed above. Pipe rules may be used to determine placement of the components (e.g., VMs 104 or groups 107) in network 100. For example, pipe rules may be added to a pipe list.

At step 222, the placement of nested group 107 may be determined. This may be based on a resource 106 requirement of the nested group 107 or a restriction of nested group 107. The placement of nested group 107 may also take into account restrictions that affect some of the members of nested group 107, such as pipe rules, other diversity rules, affinity rules, or exclusivity rules.

Once placement of the nested group is determined, at step 224, the nested group (and its members) may be deployed on network 100 based on the placement. Step 224 may also include placement of the other components (e.g., VMs 104 and groups 107) of application 102.

Figure 3:
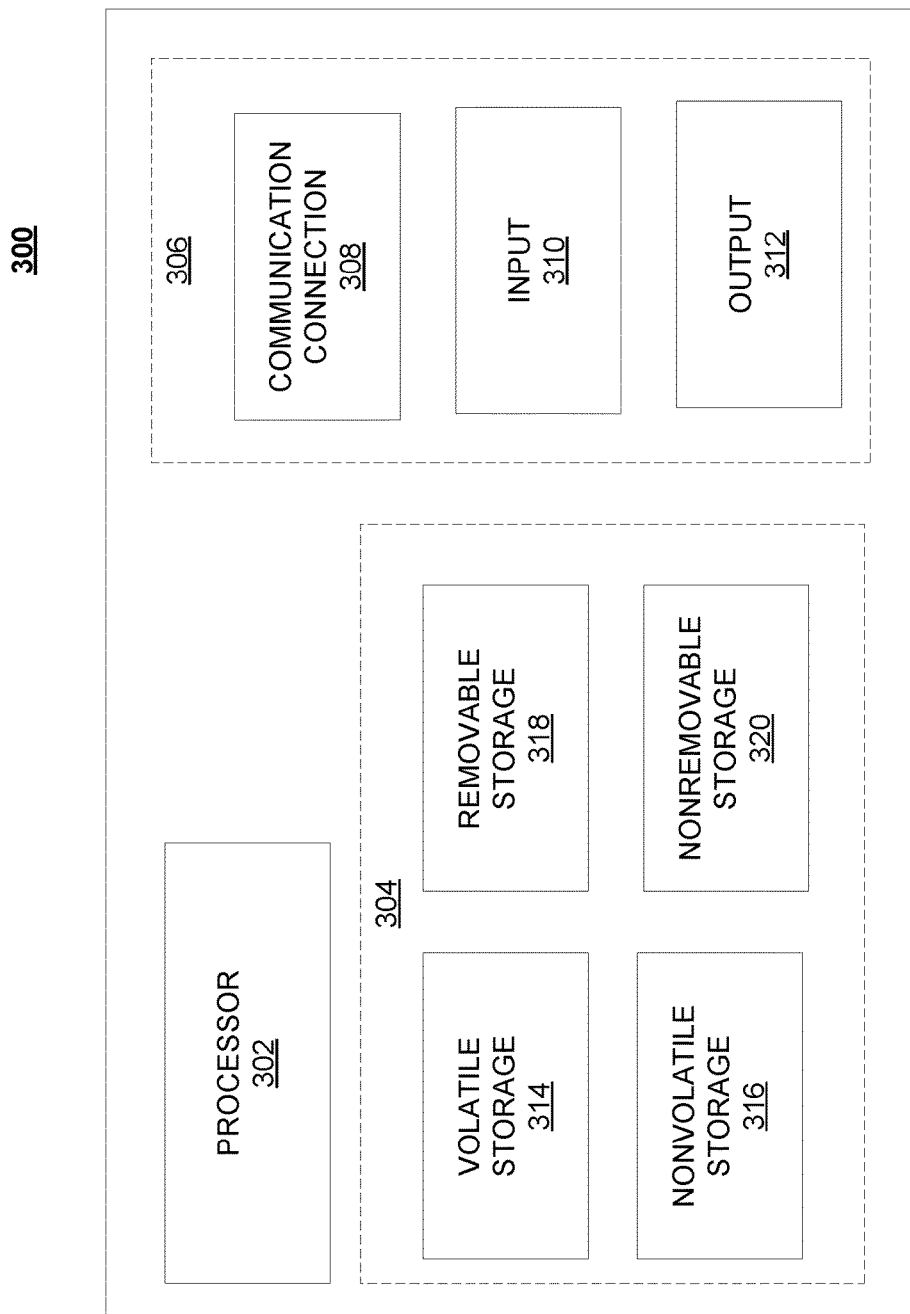
FIG. 3 is a schematic of an exemplary device that may be a component of the system of FIG. 2A.

FIG. 3 is a block diagram of network device 300 that may be connected to or comprise a component of network 100. For example, network device 300 may implement one or more portions of method 200 for placement of network components of application 102. Network device 300 may comprise hardware or a combination of hardware and software. The functionality to facilitate telecommunications via a telecommunications network may reside in one or combination of network devices 300. Network device 300 depicted in FIG. 3 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an ALFS, a gateway mobile location center (GMLC), a radio access network (RAN), a serving mobile location center (SMLC), or the like, or any appropriate combination thereof. It is emphasized that the block diagram depicted in FIG. 3 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 3) to allow communications therebetween. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a nonremovable storage 320) including, for example, tape, flash memory, smart cards, CD-ROM, DVD, or other optical storage, magnetic cassettes, magnetic tape, magnetic disk storage or other magnetic storage devices, USB-compatible media, or any other medium that can be used to store information and that can be accessed by network device 300. Memory 304 may comprise executable instructions that, when executed by processor 302, cause processor 302 to effectuate operations to map signal strengths in an area of interest.

Figure 4:
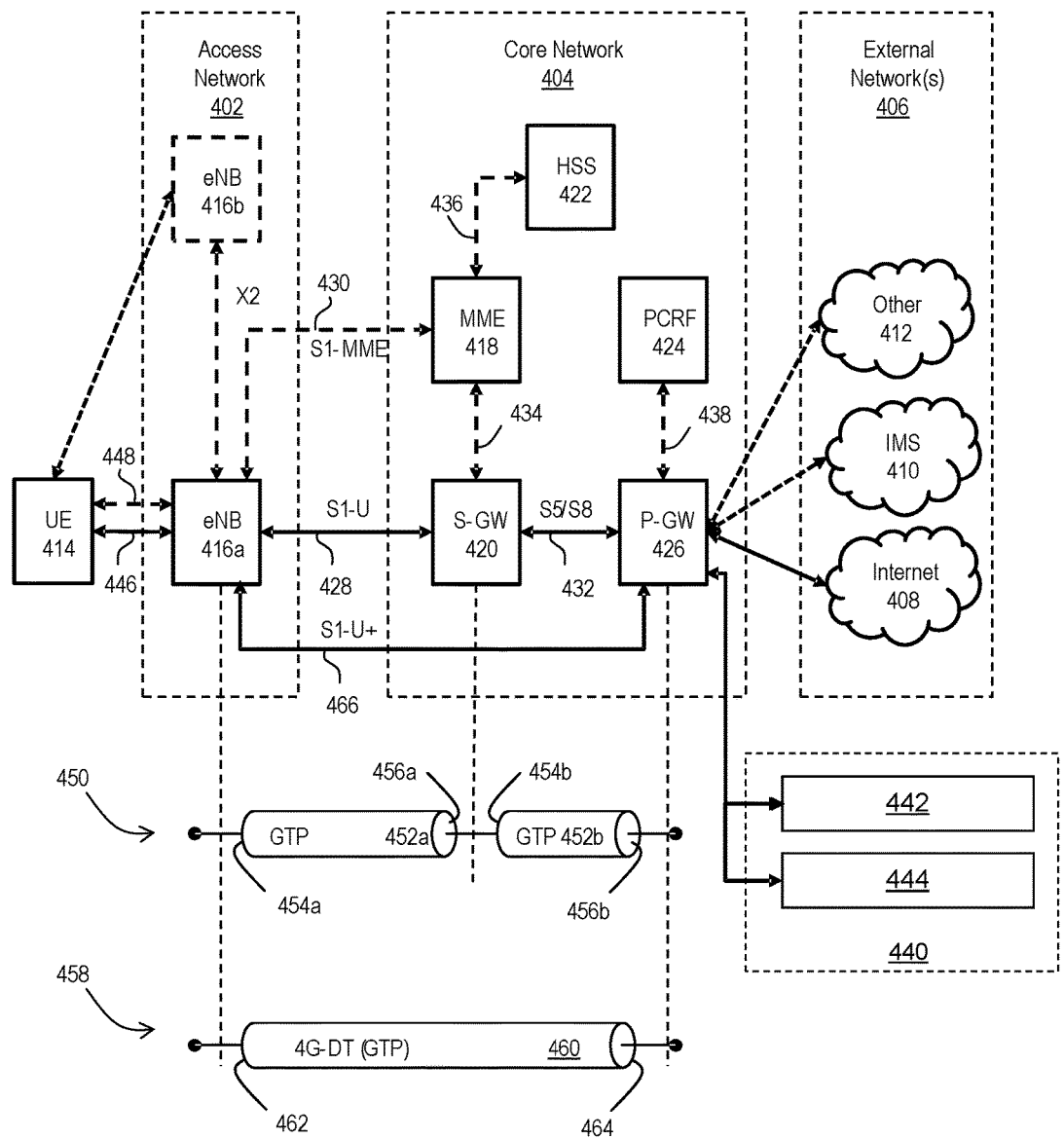
FIG. 4 depicts an exemplary communication system that provide wireless telecommunication services over wireless communication networks upon which an application may be deployed using the disclosed systems or methods.

FIG. 4 illustrates a functional block diagram depicting one example of an LTE-EPS network architecture 400 that may be at least partially implemented as using virtualized functions. Network architecture 400 disclosed herein is referred to as a modified LTE-EPS architecture 400 to distinguish it from a traditional LTE-EPS architecture.

An example modified LTE-EPS architecture 400 is based at least in part on standards developed by the 3rd Generation Partnership Project (3GPP), with information available www.3gpp.org. LTE-EPS network architecture 400 may include an access network 402, a core network 404, e.g., an EPC or Common BackBone (CBB) and one or more external networks 406, sometimes referred to as PDN or peer entities. Different external networks 406 can be distinguished from each other by a respective network identifier, e.g., a label according to DNS naming conventions describing an access point to the PDN. Such labels can be referred to as Access Point Names (APN). External networks 406 can include one or more trusted and non-trusted external networks such as an internet protocol (IP) network 408, an IP multimedia subsystem (IMS) network 410, and other networks 412, such as a service network, a corporate network, or the like. In an aspect, access network 402, core network 404, or external network 405 may include or communicate with network 100.

Access network 402 can include an LTE network architecture sometimes referred to as Evolved Universal mobile Telecommunication system Terrestrial Radio Access (E UTRA) and evolved UMTS Terrestrial Radio Access Network (E-UTRAN). Broadly, access network 402 can include one or more communication devices, commonly referred to as UE 414, and one or more wireless access nodes, or base stations 416a, 416b. During network operations, at least one base station 416 communicates directly with UE 414. Base station 416 can be an evolved Node B (e-NodeB), with which UE 414 communicates over the air and wirelessly. UEs 414 can include, without limitation, wireless devices, e.g., satellite communication systems, portable digital assistants (PDAs), laptop computers, tablet devices and other mobile devices (e.g., cellular telephones, smart appliances, and so on). UEs 414 can connect to eNBs 416 when UE 414 is within range according to a corresponding wireless communication technology.

UE 414 generally runs one or more applications that engage in a transfer of packets between UE 414 and one or more external networks 406. Such packet transfers can include one of downlink packet transfers from external network 406 to UE 414, uplink packet transfers from UE 414 to external network 406 or combinations of uplink and downlink packet transfers. Applications can include, without limitation, web browsing, VoIP, streaming media and the like. Each application can pose different Quality of Service (QoS) requirements on a respective packet transfer. Different packet transfers can be served by different bearers within core network 404, e.g., according to parameters, such as the QoS.

Core network 404 uses a concept of bearers, e.g., EPS bearers, to route packets, e.g., IP traffic, between a particular gateway in core network 404 and UE 414. A bearer refers generally to an IP packet flow with a defined QoS between the particular gateway and UE 414. Access network 402, e.g., E UTRAN, and core network 404 together set up and release bearers as required by the various applications. Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

In one embodiment, the core network 404 includes various network entities, such as MME 418, SGW 420, Home Subscriber Server (HSS) 422, Policy and Charging Rules Function (PCRF) 424 and PGW 426. In one embodiment, MME 418 comprises a control node performing a control signaling between various equipment and devices in access network 402 and core network 404. The protocols running between UE 414 and core network 404 are generally known as Non-Access Stratum (NAS) protocols.

For illustration purposes only, the terms MME 418, SGW 420, HSS 422 and PGW 426, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths and/or interfaces are terms that can include features, methodologies, and/or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 420 routes and forwards all user data packets. SGW 420 also acts as a mobility anchor for user plane operation during handovers between base stations, e.g., during a handover from first eNB 416a to second eNB 416b as may be the result of UE 414 moving from one area of coverage, e.g., cell, to another. SGW 420 can also terminate a downlink data path, e.g., from external network 406 to UE 414 in an idle state, and trigger a paging operation when downlink data arrives for UE 414. SGW 420 can also be configured to manage and store a context for UE 414, e.g., including one or more of parameters of the IP bearer service and network internal routing information. In addition, SGW 420 can perform administrative functions, e.g., in a visited network, such as collecting information for charging (e.g., the volume of data sent to or received from the user), and/or replicate user traffic, e.g., to support a lawful interception. SGW 420 also serves as the mobility anchor for interworking with other 3GPP technologies such as universal mobile telecommunication system (UMTS).

At any given time, UE 414 is generally in one of three different states: detached, idle, or active. The detached state is typically a transitory state in which UE 414 is powered on but is engaged in a process of searching and registering with network 402. In the active state, UE 414 is registered with access network 402 and has established a wireless connection, e.g., radio resource control (RRC) connection, with eNB 416. Whether UE 414 is in an active state can depend on the state of a packet data session, and whether there is an active packet data session. In the idle state, UE 414 is generally in a power conservation state in which UE 414 typically does not communicate packets. When UE 414 is idle, SGW 420 can terminate a downlink data path, e.g., from one peer entity, and triggers paging of UE 414 when data arrives for UE 414. If UE 414 responds to the page, SGW 420 can forward the IP packet to eNB 416a.

HSS 422 can manage subscription-related information for a user of UE 414. For example, tHSS 422 can store information such as authorization of the user, security requirements for the user, quality of service (QoS) requirements for the user, etc. HSS 422 can also hold information about external networks 406 to which the user can connect, e.g., in the form of an APN of external networks 406. For example, MME 418 can communicate with HSS 422 to determine if UE 414 is authorized to establish a call, e.g., a voice over IP (VoIP) call before the call is established.

PCRF 424 can perform QoS management functions and policy control. PCRF 424 is responsible for policy control decision-making, as well as for controlling the flow-based charging functionalities in a policy control enforcement function (PCEF), which resides in PGW 426. PCRF 424 provides the QoS authorization, e.g., QoS class identifier and bit rates that decide how a certain data flow will be treated in the PCEF and ensures that this is in accordance with the user's subscription profile.

PGW 426 can provide connectivity between the UE 414 and one or more of the external networks 406. In illustrative network architecture 400, PGW 426 can be responsible for IP address allocation for UE 414, as well as one or more of QoS enforcement and flow-based charging, e.g., according to rules from the PCRF 424. PGW 426 is also typically responsible for filtering downlink user IP packets into the different QoS-based bearers. In at least some embodiments, such filtering can be performed based on traffic flow templates. PGW 426 can also perform QoS enforcement, e.g., for guaranteed bit rate bearers. PGW 426 also serves as a mobility anchor for interworking with non-3GPP technologies such as CDMA2000.

Within access network 402 and core network 404 there may be various bearer paths/interfaces, e.g., represented by solid lines 428 and 430. Some of the bearer paths can be referred to by a specific label. For example, solid line 428 can be considered an S1-U bearer and solid line 432 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 404 can include various signaling bearer paths/interfaces, e.g., control plane paths/interfaces represented by dashed lines 430, 434, 436, and 438. Some of the signaling bearer paths may be referred to by a specific label. For example, dashed line 430 can be considered as an S1-MME signaling bearer, dashed line 434 can be considered as an S11 signaling bearer and dashed line 436 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 466. In the illustrative example, the S1-U+ user plane interface extends between the eNB 416a and PGW 426. Notably, S1-U+ path/interface does not include SGW 420, a node that is otherwise instrumental in configuring and/or managing packet forwarding between eNB 416a and one or more external networks 406 by way of PGW 426. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 420, 426 due to excessive handover events.

In some embodiments, PGW 426 is coupled to storage device 440, shown in phantom. Storage device 440 can be integral to one of the network nodes, such as PGW 426, for example, in the form of internal memory and/or disk drive. It is understood that storage device 440 can include registers suitable for storing address values. Alternatively or in addition, storage device 440 can be separate from PGW 426, for example, as an external hard drive, a flash drive, and/or network storage.

Storage device 440 selectively stores one or more values relevant to the forwarding of packet data. For example, storage device 440 can store identities and/or addresses of network entities, such as any of network nodes 418, 420, 422, 424, and 426, eNBs 416 and/or UE 414. In the illustrative example, storage device 440 includes a first storage location 442 and a second storage location 444. First storage location 442 can be dedicated to storing a Currently Used Downlink address value 442. Likewise, second storage location 444 can be dedicated to storing a Default Downlink Forwarding address value 444. PGW 426 can read and/or write values into either of storage locations 442, 444, for example, managing Currently Used Downlink Forwarding address value 442 and Default Downlink Forwarding address value 444 as disclosed herein.

In some embodiments, the Default Downlink Forwarding address for each EPS bearer is the SGW S5-U address for each EPS Bearer. The Currently Used Downlink Forwarding address" for each EPS bearer in PGW 426 can be set every time when PGW 426 receives an uplink packet, e.g., a GTP-U uplink packet, with a new source address for a corresponding EPS bearer. When UE 414 is in an idle state, the "Current Used Downlink Forwarding address" field for each EPS bearer of UE 414 can be set to a "null" or other suitable value.

In some embodiments, the Default Downlink Forwarding address is only updated when PGW 426 receives a new SGW S5-U address in a predetermined message or messages. For example, the Default Downlink Forwarding address is only updated when PGW 426 receives one of a Create Session Request, Modify Bearer Request and Create Bearer Response messages from SGW 420.

As values 442, 444 can be maintained and otherwise manipulated on a per bearer basis, it is understood that the storage locations can take the form of tables, spreadsheets, lists, and/or other data structures generally well understood and suitable for maintaining and/or otherwise manipulate forwarding addresses on a per bearer basis.

It should be noted that access network 402 and core network 404 are illustrated in a simplified block diagram in FIG. 4. In other words, either or both of access network 402 and the core network 404 can include additional network elements that are not shown, such as various routers, switches and controllers. In addition, although FIG. 4 illustrates only a single one of each of the various network elements, it should be noted that access network 402 and core network 404 can include any number of the various network elements. For example, core network 404 can include a pool (i.e., more than one) of MMEs 418, SGWs 420 or PGWs 426.

In the illustrative example, data traversing a network path between UE 414, eNB 416a, SGW 420, PGW 426 and external network 406 may be considered to constitute data transferred according to an end-to-end IP service. However, for the present disclosure, to properly perform establishment management in LTE-EPS network architecture 400, the core network, data bearer portion of the end-to-end IP service is analyzed.

An establishment may be defined herein as a connection set up request between any two elements within LTE-EPS network architecture 400. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 446) between UE 414 and eNB 416a, a second portion (e.g., an S1 data bearer 428) between eNB 416a and SGW 420, and a third portion (e.g., an S5/S8 bearer 432) between SGW 420 and PGW 426. Various signaling bearer portions are also illustrated in FIG. 4. For example, a first signaling portion (e.g., a signaling radio bearer 448) between UE 414 and eNB 416a, and a second signaling portion (e.g., S1 signaling bearer 430) between eNB 416a and MME 418.

In at least some embodiments, the data bearer can include tunneling, e.g., IP tunneling, by which data packets can be forwarded in an encapsulated manner, between tunnel endpoints. Tunnels, or tunnel connections can be identified in one or more nodes of network 100, e.g., by one or more of tunnel endpoint identifiers, an IP address and a user datagram protocol port number. Within a particular tunnel connection, payloads, e.g., packet data, which may or may not include protocol related information, are forwarded between tunnel endpoints.

An example of first tunnel solution 450 includes a first tunnel 452a between two tunnel endpoints 454a and 456a, and a second tunnel 452b between two tunnel endpoints 454b and 456b. In the illustrative example, first tunnel 452a is established between eNB 416a and SGW 420. Accordingly, first tunnel 452a includes a first tunnel endpoint 454a corresponding to an S1-U address of eNB 416a (referred to herein as the eNB S1-U address), and second tunnel endpoint 456a corresponding to an S1-U address of SGW 420 (referred to herein as the SGW S1-U address). Likewise, second tunnel 452b includes first tunnel endpoint 454b corresponding to an S5-U address of SGW 420 (referred to herein as the SGW S5-U address), and second tunnel endpoint 456b corresponding to an S5-U address of PGW 426 (referred to herein as the PGW S5-U address).

In at least some embodiments, first tunnel solution 450 is referred to as a two tunnel solution, e.g., according to the GPRS Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each PDP context that they have active, as well as possibly having separate tunnels for specific connections with different quality of service requirements, and so on.

An example of second tunnel solution 458 includes a single or direct tunnel 460 between tunnel endpoints 462 and 464. In the illustrative example, direct tunnel 460 is established between eNB 416a and PGW 426, without subjecting packet transfers to processing related to SGW 420. Accordingly, direct tunnel 460 includes first tunnel endpoint 462 corresponding to the eNB S1-U address, and second tunnel endpoint 464 corresponding to the PGW S5-U address. Packet data received at either end can be encapsulated into a payload and directed to the corresponding address of the other end of the tunnel. Such direct tunneling avoids processing, e.g., by SGW 420 that would otherwise relay packets between the same two endpoints, e.g., according to a protocol, such as the GTP-U protocol.

In some scenarios, direct tunneling solution 458 can forward user plane data packets between eNB 416a and PGW 426, by way of SGW 420. That is, SGW 420 can serve a relay function, by relaying packets between two tunnel endpoints 416a, 426. In other scenarios, direct tunneling solution 458 can forward user data packets between eNB 416a and PGW 426, by way of the S1 U+ interface, thereby bypassing SGW 420.

Generally, UE 414 can have one or more bearers at any one time. The number and types of bearers can depend on applications, default requirements, and so on. It is understood that the techniques disclosed herein, including the configuration, management and use of various tunnel solutions 450, 458, can be applied to the bearers on an individual bases. That is, if user data packets of one bearer, say a bearer associated with a VoIP service of UE 414, then the forwarding of all packets of that bearer are handled in a similar manner. Continuing with this example, the same UE 414 can have another bearer associated with it through the same eNB 416a. This other bearer, for example, can be associated with a relatively low rate data session forwarding user data packets through core network 404 simultaneously with the first bearer. Likewise, the user data packets of the other bearer are also handled in a similar manner, without necessarily following a forwarding path or solution of the first bearer. Thus, one of the bearers may be forwarded through direct tunnel 458; whereas, another one of the bearers may be forwarded through a two-tunnel solution 450.

Figure 5:
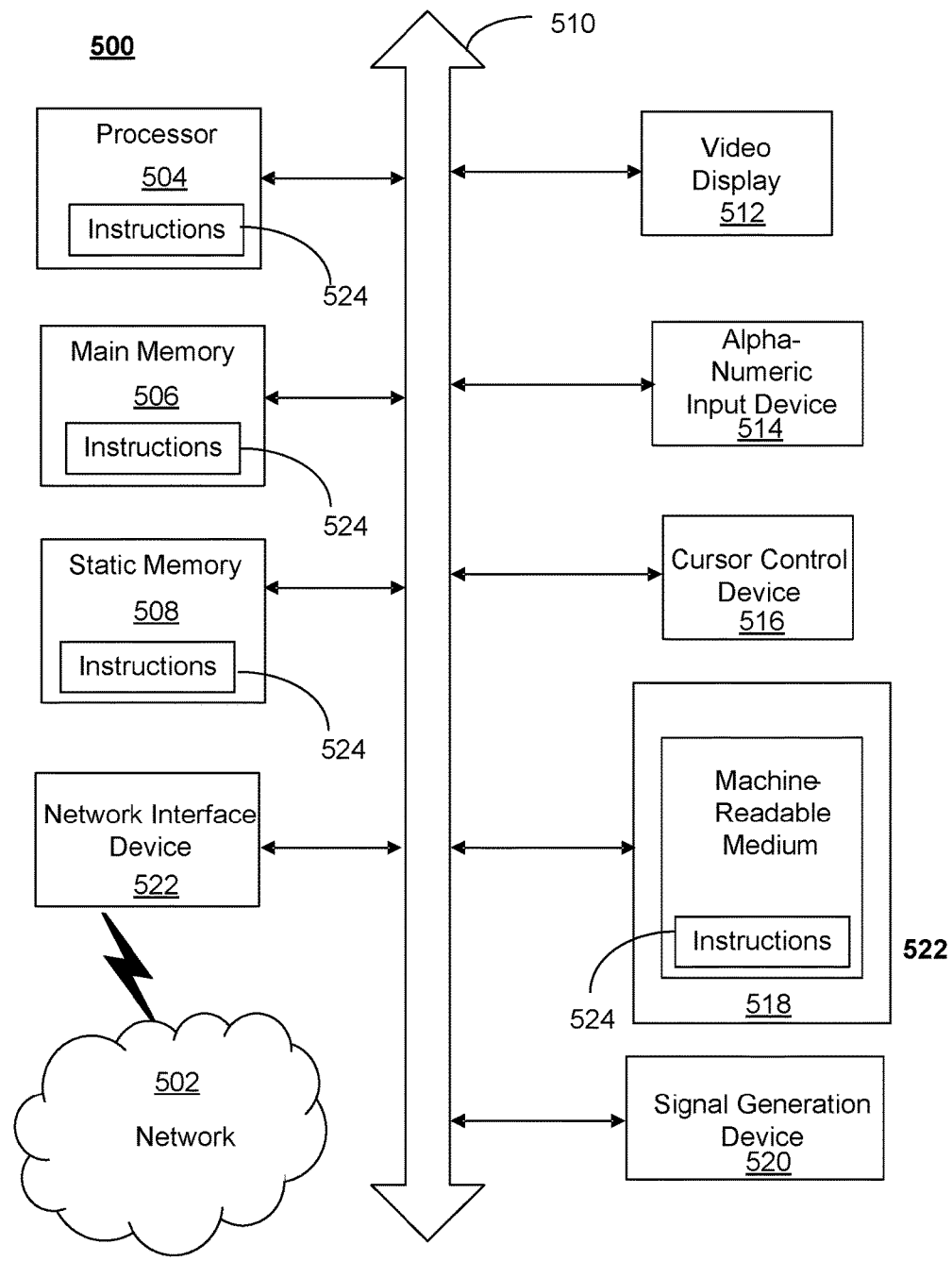
FIG. 5 depicts an exemplary communication system that provide wireless telecommunication services over wireless communication networks that may be modeled using the disclosed systems and methods for configuring a virtualized network platform.

FIG. 5 depicts an exemplary diagrammatic representation of a machine in the form of a computer system 500 within which a set of instructions, when executed, may cause the machine to perform any one or more of the methods described above. One or more instances of the machine can operate, for example, as processor 302, UE 414, eNB 416, MME 418, SGW 420, HSS 422, PCRF 424, PGW 426 and other devices of FIGS. 1, 2, and 4. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 6:
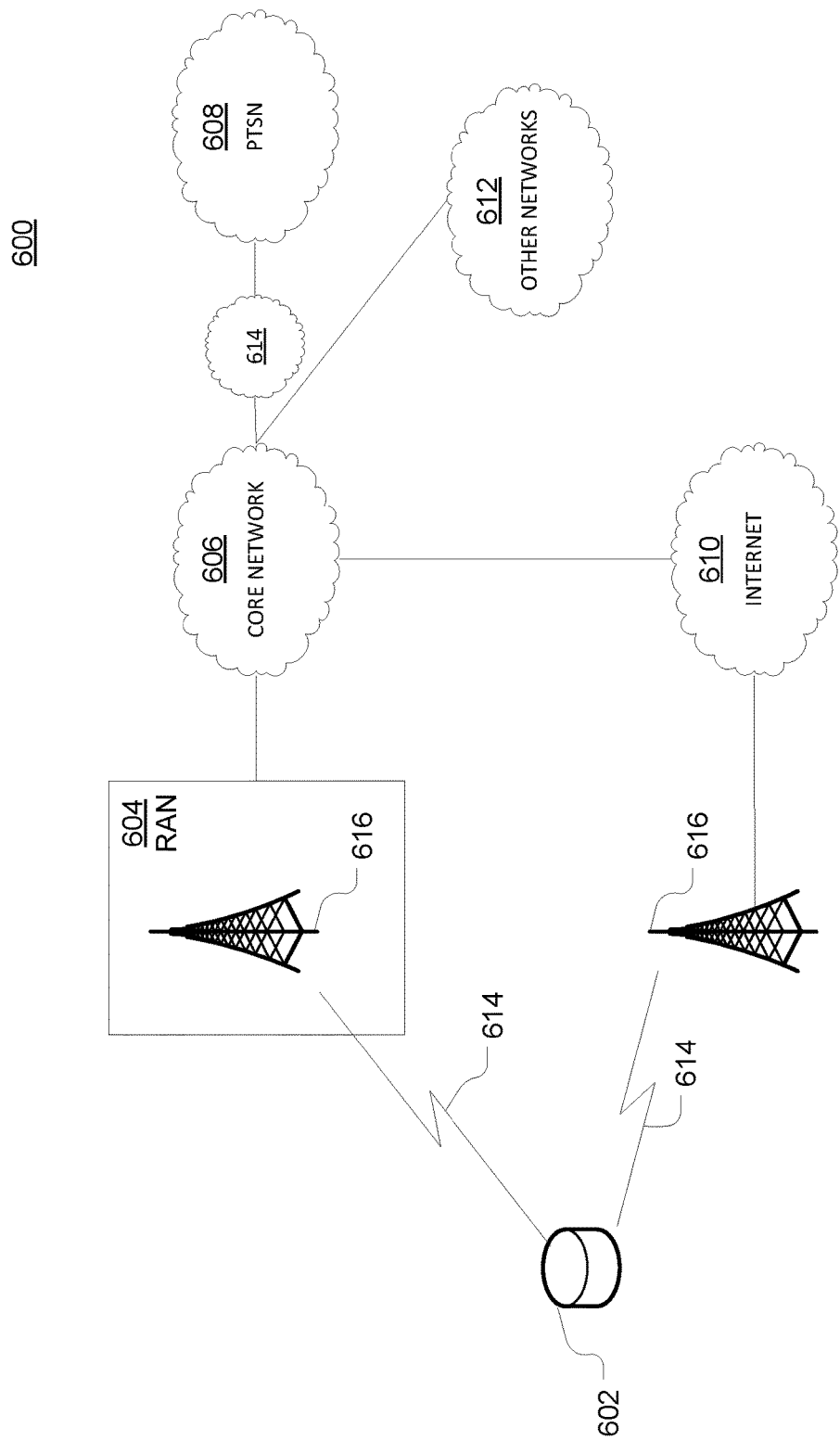
FIG. 6 is a diagram of an exemplary telecommunications system in which the disclosed systems or methods may be implemented.

As shown in FIG. 6, telecommunication system 600 may include wireless transmit/receive units (WTRUs) 602, a RAN 604, a core network 606, a public switched telephone network (PSTN) 608, the Internet 610, or other networks 612, though it will be appreciated that the disclosed examples contemplate any number of WTRUs, base stations, networks, or network elements. Each WTRU 602 may be any type of device configured to operate or communicate in a wireless environment. For example, a WTRU may comprise a mobile device, network device 300, or the like, or any combination thereof. By way of example, WTRUs 602 may be configured to transmit or receive wireless signals and may include a UE, a mobile station, a mobile device, a fixed or mobile subscriber unit, a pager, a cellular telephone, a PDA, a smartphone, a laptop, a netbook, a personal computer, a wireless sensor, consumer electronics, or the like. WTRUs 602 may be configured to transmit or receive wireless signals over an air interface 614.

Telecommunication system 600 may also include one or more base stations 616. Each of base stations 616 may be any type of device configured to wirelessly interface with at least one of the WTRUs 602 to facilitate access to one or more communication networks, such as core network 606, PTSN 608, Internet 610, or other networks 612. By way of example, base stations 616 may be a base transceiver station (BTS), a Node-B, an eNode B, a Home Node B, a Home eNode B, a site controller, an access point (AP), a wireless router, or the like. While base stations 616 are each depicted as a single element, it will be appreciated that base stations 616 may include any number of interconnected base stations or network elements.

RAN 604 may include one or more base stations 616, along with other network elements (not shown), such as a base station controller (BSC), a radio network controller (RNC), or relay nodes. One or more base stations 616 may be configured to transmit or receive wireless signals within a particular geographic region, which may be referred to as a cell (not shown). The cell may further be divided into cell sectors. For example, the cell associated with base station 616 may be divided into three sectors such that base station 616 may include three transceivers: one for each sector of the cell. In another example, base station 616 may employ multiple-input multiple-output (MIMO) technology and, therefore, may utilize multiple transceivers for each sector of the cell.

Base stations 616 may communicate with one or more of WTRUs 602 over air interface 614, which may be any suitable wireless communication link (e.g., RF, microwave, infrared (IR), ultraviolet (UV), or visible light). Air interface 614 may be established using any suitable radio access technology (RAT).

More specifically, as noted above, telecommunication system 600 may be a multiple access system and may employ one or more channel access schemes, such as CDMA, TDMA, FDMA, OFDMA, SC-FDMA, or the like. For example, base station 616 in RAN 604 and WTRUs 602 connected to RAN 604 may implement a radio technology such as Universal Mobile Telecommunications System (UMTS) Terrestrial Radio Access (UTRA) that may establish air interface 614 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 616 and WTRUs 602 that are connected to RAN 604 may implement a radio technology such as Evolved UMTS Terrestrial Radio Access (E-UTRA), which may establish air interface 614 using LTE or LTE-Advanced (LTE-A).

Optionally base station 616 and WTRUs 602 connected to RAN 604 may implement radio technologies such as IEEE 602.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 616 may be a wireless router, Home Node B, Home eNode B, or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 602.11 to establish a wireless local area network (WLAN). As another example, base station 616 and associated WTRUs 602 may implement a radio technology such as IEEE 602.15 to establish a wireless personal area network (WPAN). In yet another example, base station 616 and associated WTRUs 602 may utilize a cellular-based RAT (e.g., WCDMA, CDMA2000, GSM, LTE, LTE-A, etc.) to establish a picocell or femtocell. As shown in FIG. 6, base station 616 may have a direct connection to Internet 610. Thus, base station 616 may not be required to access Internet 610 via core network 606.

RAN 604 may be in communication with core network 606, which may be any type of network configured to provide voice, data, applications, and/or voice over internet protocol (VoIP) services to one or more WTRUs 602. For example, core network 606 may provide call control, billing services, mobile location-based services, pre-paid calling, Internet connectivity, video distribution or high-level security functions, such as user authentication. Although not shown in FIG. 6, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN (not shown) employing a GSM radio technology.

Core network 606 may also serve as a gateway for WTRUs 602 to access PSTN 608, Internet 610, or other networks 612. PSTN 608 may include circuit-switched telephone networks that provide plain old telephone service (POTS). For LTE core networks, core network 606 may use IMS core 614 to provide access to PSTN 608. Internet 610 may include a global system of interconnected computer networks or devices that use common communication protocols, such as the transmission control protocol (TCP), user datagram protocol (UDP), or IP in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. That is, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology.

Figure 7:
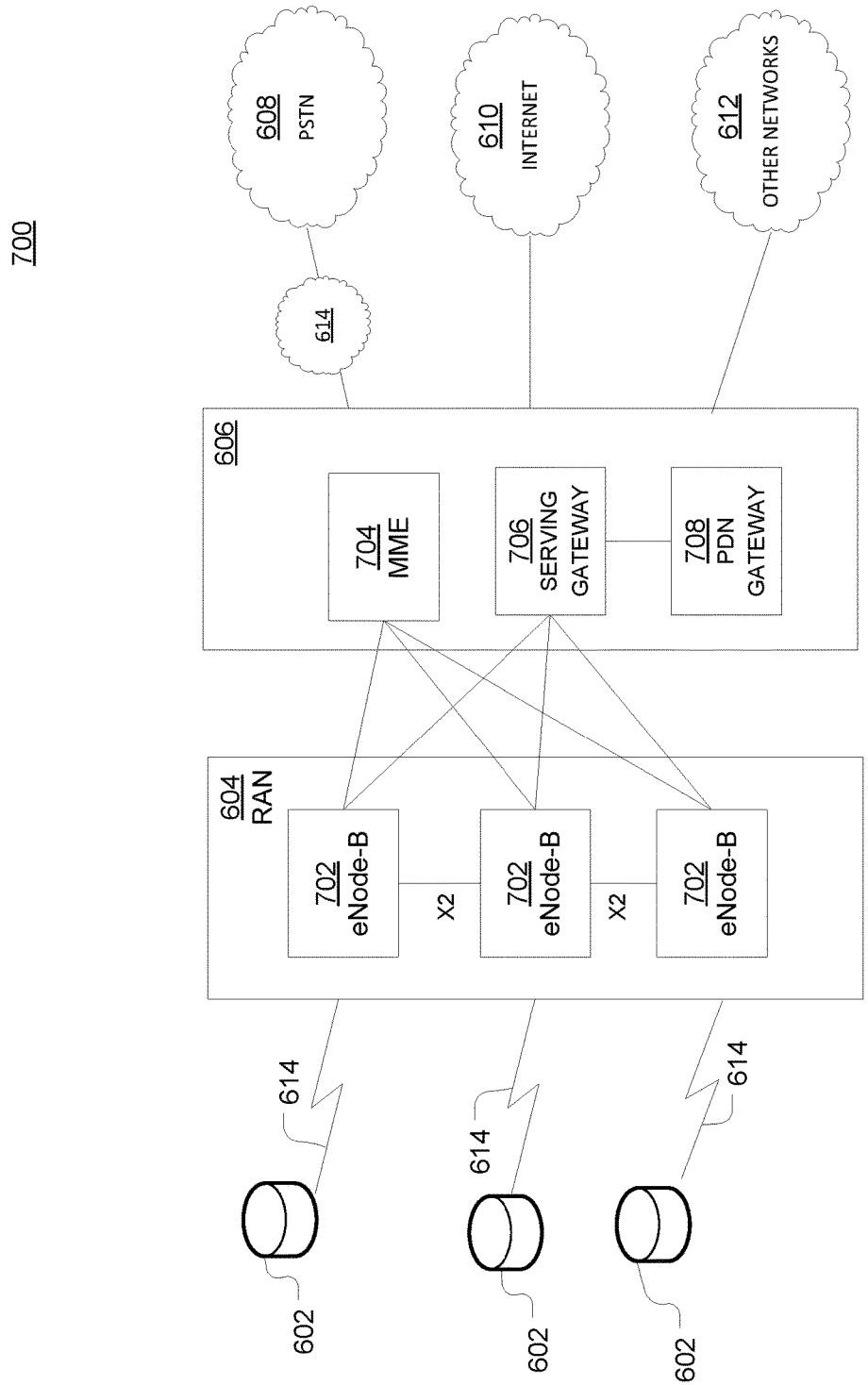
FIG. 7 is an example system diagram of a radio access network and a core network upon which an application may be deployed using the disclosed systems or methods.

FIG. 7 is an example system 700 including RAN 604 and core network 606. As noted above, RAN 604 may employ an E-UTRA radio technology to communicate with WTRUs 602 over air interface 614. RAN 604 may also be in communication with core network 606.

RAN 604 may include any number of eNode-Bs 702 while remaining consistent with the disclosed technology. One or more eNode-Bs 702 may include one or more transceivers for communicating with the WTRUs 602 over air interface 614. Optionally, eNode-Bs 702 may implement MIMO technology. Thus, one of eNode-Bs 702, for example, may use multiple antennas to transmit wireless signals to, or receive wireless signals from, one of WTRUs 602.

Each of eNode-Bs 702 may be associated with a particular cell (not shown) and may be configured to handle radio resource management decisions, handover decisions, scheduling of users in the uplink or downlink, or the like. As shown in FIG. 7 eNode-Bs 702 may communicate with one another over an X2 interface.

Core network 606 shown in FIG. 7 may include a mobility management gateway or entity (MME) 704, a serving gateway 706, or a packet data network (PDN) gateway 708. While each of the foregoing elements are depicted as part of core network 606, it will be appreciated that any one of these elements may be owned or operated by an entity other than the core network operator.

MME 704 may be connected to each of eNode-Bs 702 in RAN 604 via an S1 interface and may serve as a control node. For example, MME 704 may be responsible for authenticating users of WTRUs 602, bearer activation or deactivation, selecting a particular serving gateway during an initial attach of WTRUs 602, or the like. MME 704 may also provide a control plane function for switching between RAN 604 and other RANs (not shown) that employ other radio technologies, such as GSM or WCDMA.

Serving gateway 706 may be connected to each of eNode-Bs 702 in RAN 604 via the S1 interface. Serving gateway 706 may generally route or forward user data packets to or from the WTRUs 602. Serving gateway 706 may also perform other functions, such as anchoring user planes during inter-eNode B handovers, triggering paging when downlink data is available for WTRUs 602, managing or storing contexts of WTRUs 602, or the like.

Serving gateway 706 may also be connected to PDN gateway 708, which may provide WTRUs 602 with access to packet-switched networks, such as Internet 610, to facilitate communications between WTRUs 602 and IP-enabled devices.

Core network 606 may facilitate communications with other networks. For example, core network 606 may provide WTRUs 602 with access to circuit-switched networks, such as PSTN 608, such as through IMS core 614, to facilitate communications between WTRUs 602 and traditional landline communications devices. In addition, core network 606 may provide the WTRUs 602 with access to other networks 612, which may include other wired or wireless networks that are owned or operated by other service providers.

The invention claimed is:

1. A method comprising:
   identifying virtual machines (VMs) to be instantiated to deploy an application on a network infrastructure, the network infrastructure having a hierarchy including a server level, a rack level, and a site level;
   identifying a first restriction regarding placement of a first group of the VMs and a second restriction regarding placement of a second group of the VMs;
   based at least on a level of the first restriction not exceeding a level of the second restriction, nesting the first group into the second group to create a nested group having members that include the first group and each VM of the second group;
   determining a resource requirement of the nested group by summing together a respective resource requirement of each of the members;
   identifying a pipe rule in which one of the VMs of the first group or one of the VMs of the second group is an ancestor, the pipe rule requiring that a communication from the ancestor to the descendant meet a communication requirement, the communication requirement including at least one of a bandwidth requirement or a latency requirement;
   identifying a descendant of the pipe rule;
   if the descendant is not a member of the nested group, adding the descendant to a pipe list,
   identifying a placement of the nested group within the network infrastructure based at least on the second restriction, the pipe list, and the resource requirement; and
   deploying the nested group based at least on the placement of the nested group.

2. The method of claim 1, wherein
   the level of the first restriction comprises at least one of the server level, the rack level, or the site level, and
   the level of the second restriction comprises at least one of the server level, the rack level or the site level.

3. The method of claim 1, wherein deploying the nested group comprises deploying the application.

4. The method of claim 1, wherein the first restriction is a diversity rule that requires each of the VMs of the first group be located at different locations, the different locations based at least on the level of the first restriction.

5. The method of claim 1, wherein the first restriction is an exclusivity rule that requires each of the VMs of the first group be located at a single-tenant location, the single-tenant location based at least on the level of the first restriction.

6. The method of claim 1, further comprising:
identifying a second pipe rule concerning communications between a first VM of the VMs and a second VM of the VMs;
identifying a placement of the first VM and a placement of the second VM based at least on the pipe rule; and
deploying the first VM and the second VM based at least on the placement of the first VM and the placement of the second VM.

7. The method of claim 1, wherein the first restriction is an affinity rule that requires each of the VMs of the first group be located at a common location, the common location based at least on the level of the first restriction.

8. The method of claim 7, wherein the second restriction is a second affinity rule that requires each of the VMs of the second group be located at a second common location, the second common location based at least on the level of the second restriction.

9. The method of claim 7, wherein the second restriction is a diversity rule that requires each of the VMs of the second group be located at different locations, the different locations based at least on the level of the second restriction.

10. The method of claim 7, wherein the second restriction is an exclusivity rule that requires each of the VMs of the second group be located at a single-tenant location, the single-tenant location based at least on the level of the second restriction.

11. The method of claim 7, further comprising resolving a scope of the nested group.

12. A system comprising:
an input/output;
a processor communicatively coupled to the input/output; and
memory storing instructions that cause the processor to effectuate operations, the operations comprising:
identifying virtual machines (VMs) to be instantiated to deploy an application on a network infrastructure, the network infrastructure having a hierarchy including a server level, a rack level, and a site level;
identifying a first restriction regarding placement of a first group of the VMs and a second restriction regarding placement of a second group of the VMs;
determining that the first group and the second group each include a common VM of the VMs;
based at least on a level of the first restriction not exceeding a level of the second restriction, nesting the first group into the second group to create a nested group having members that include the first group and each VM of the second group;
determining a resource requirement of the nested group by summing together a respective resource requirement of each of the members;
identifying a placement of the nested group within the network infrastructure based at least on the second restriction and the resource requirement; and
deploying, via the input/output, the nested group based at least on the placement of the nested group.

13. The system of claim 12, wherein the placement of the nested group is consistent with the first restriction and the second restriction.

14. The system of claim 12, wherein the second restriction is an affinity rule that requires each of the VMs of the second group be located at a common location, the common location based at least on the level of the second restriction.

15. The system of claim 12, wherein the second restriction is a diversity rule that requires each of the VMs of the second group be located at different locations, the different locations based at least on the level of the second restriction.

16. The system of claim 12, wherein the second restriction is an exclusivity rule that requires each of the VMs of the second group be located at a single-tenant location, the single-tenant location based at least on the level of the second restriction.

17. The system of claim 16, wherein the single-tenant location comprises a server and the level of the second restriction comprises a server level.

18. The system of claim 16, wherein the single-tenant location comprises a rack and the level of the second restriction comprises a rack level.

19. The system of claim 12, the operations further comprising resolving a scope of the nested group.

20. The system of claim 12, the operations further comprising: identifying a pipe rule that requires that communications between a first VM of the VMs and a second VM of the VMs meet a communication requirement;
identifying a placement of the first VM and a placement of the second VM based at least on the pipe rule; and
deploying the first VM and the second VM based at least on the placement of the first VM and the placement of the second VM,
wherein the communication requirement comprises at least one of a bandwidth requirement or a latency requirement.

* * * * *